K. RUSHTON.
SCREW REVERSE VALVE MECHANISM FOR LOCOMOTIVES.
APPLICATION FILED NOV. 30, 1914.
1,145,800.
Patented July 6, 1915.
3 SHEETS—SHEET 1.
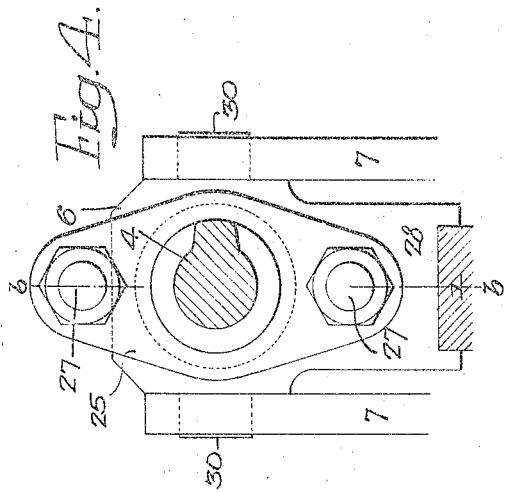
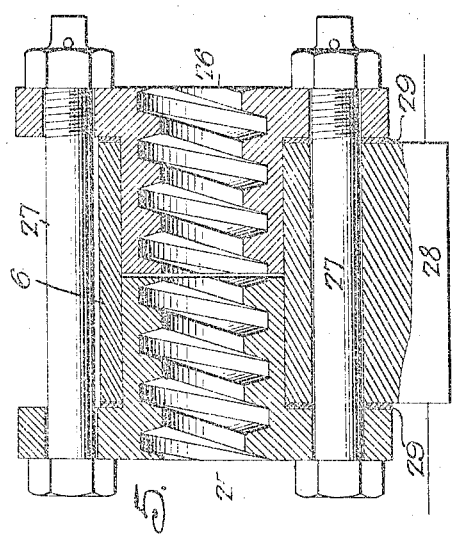
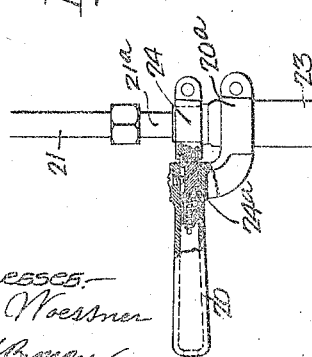
Inventor-
Kenneth Rushton,
by his Attorneys-

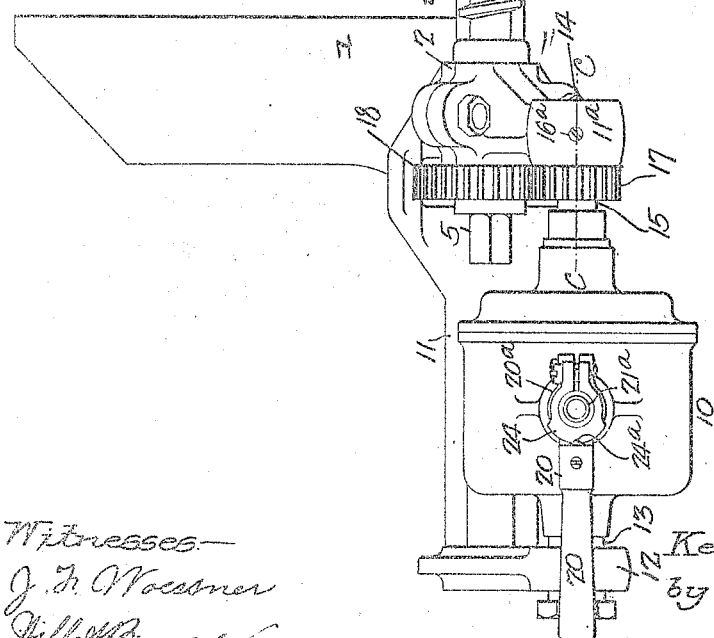

K. RUSHTON.
SCREW REVERSE VALVE MECHANISM FOR LOCOMOTIVES.
APPLICATION FILED NOV. 30, 1914.

1,145,800.

Patented July 6, 1915.
3 SHEETS—SHEET 3.

Witnesses—

Inventor—
Kenneth Rushton.
by his Attorneys

UNITED STATES PATENT OFFICE.

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

SCREW REVERSE VALVE MECHANISM FOR LOCOMOTIVES.

1,145,800.  Specification of Letters Patent.  Patented July 6, 1915.

Application filed November 30, 1914. Serial No. 874,889.

*To all whom it may concern:*

Be it known that I, KENNETH RUSHTON, a citizen of the United States, residing in Philadelphia, Pennsylvania, have invented certain Improvements in Screw Reverse Valve Mechanism for Locomotives, of which the following is a specification.

My invention relates to certain improvements in reverse mechanism for the valves of locomotives, in which the lever is actuated by a screw.

One object of the invention is to actuate the screw by a suitable form of motor and to arrange the parts so that the engine can be readily disconnected from the screw when it is desired to turn the screw by hand.

A further object of the invention is to provide an adjustable nut to take the wear on the screw and nut so as to insure the accurate working of the mechanism.

Figure 3:
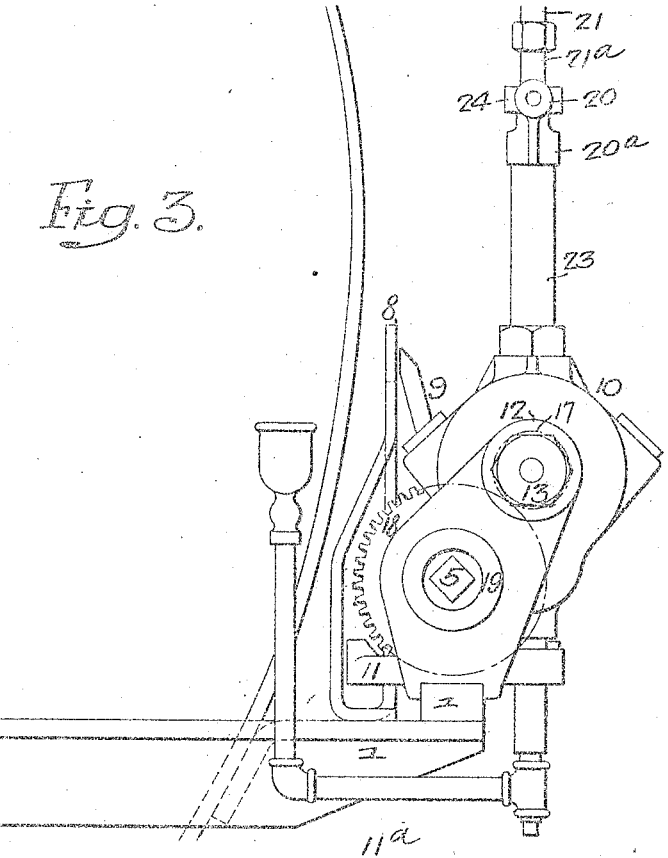
Figure 6:
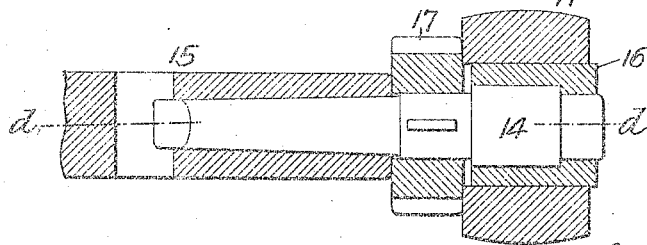
Figure 7:
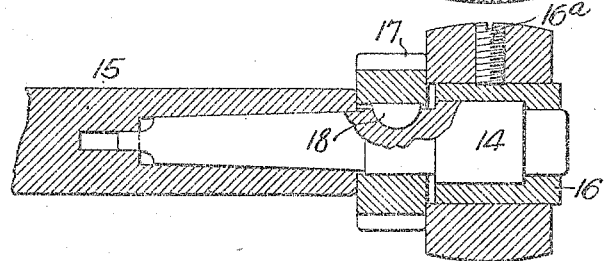

In the accompanying drawings: Figure 1 is a side view of my improved reverse mechanism; Fig. 2 is a plan view; Fig. 3 is an end view; Fig. 4 is a sectional view on the line $a$—$a$, Fig. 1; Fig. 5 is a sectional view on the line $b$—$b$, Fig. 4; Fig. 6 is a sectional view through the spindle on the line $c$—$c$, Fig. 2, and Fig. 7, is a sectional view on the line $d$—$d$, Fig. 6.

Referring to the drawings, 1 is a frame arranged to be secured in any suitable manner to the locomotive structure and on this frame are bearings 2 and 3 for a screw shaft 4 having one end 5 squared, or otherwise shaped, to receive a crank by which it can be turned by hand.

6 is a nut arranged to travel on the screw 4 and connected to this nut is an operating rod 7, which is connected to the reverse mechanism.

8 is a plate secured to the frame and this plate has indicating marks thereon and on the nut is a pointer 9, which travels in close proximity to the plate, as clearly shown in Figs. 1 and 2.

10 represents a motor mounted on a bracket 11; in the present instance a fluid pressure (air) controlled motor, which bracket is firmly secured to the frame 1, and this bracket not only carries the bearing 2 and the extension 11$^a$ of the bearing, but also carries an arm 12. The casing of the air motor 10 has an extension 13 mounted in the arm 12 of the bracket and a spindle 14 is carried by the extension 11$^a$ of the bearing 2 and projects into an opening in the end 15 of the motor, as clearly shown in Figs. 6 and 7. The spindle 14 has a bushing 16, which is confined to the extension 11$^a$ of the bearing 2 by a set screw 16$^a$ and the spindle is tapered to fit a tapered opening in the shaft 15. Located on the spindle 14 is a pinion 17, which is secured to the spindle by a key 18, as shown clearly in Fig. 7, and this pinion 17 meshes with a gear wheel 18 secured to the screw shaft 4 so that when motion is imparted to the shaft 15 of the motor the screw will be turned. When it is desired to detach the screw from the motor, then the set screw 16$^a$ is backed off and the spindle 14 is withdrawn, thus releasing the pinion 17. A crank can then be inserted through the opening 19 in the arm of the frame and placed over the squared end 5 of the screw, after which the screw can be turned by the crank in either direction.

The air motor which I have illustrated as the motive means is controlled by means of a lever 20, which is mounted below a supply pipe 21 and clamped to the motor handle 23 at 20$^a$.

24 is a segment clamped on an extension 21$^a$ to which the pipe 21 is connected and the lever has a spring-pressed plunger 24$^a$ for engagement with notches formed in said segment 24. When the lever is shifted to one position the screw is turned in one direction and when shifted to the other position the screw is turned in the opposite direction so that the operator can control the position of the nut on the screw by this hand lever.

In order to take the wear between the nut and the screw, I preferably make the nut in two sections 25 and 26, as shown in Figs. 4 and 5. Each section has a flange at its outer end and bolts 27 secure these sections to the body portion 28 of the nut 6. This body portion slides on the frame 1 as indicated in Figs. 1 and 4. Mounted between each flange and the body portion 28 are thin sheet liners 29 and it will be noticed that there is a gap between the inner ends of the sections 25 and 26 and this gap can be gradually closed by taking out a thin liner at either end as the nut wears. In the present instance, the body portion 28 has two trunnions 30 and the operating rod 7 is forked or is made in two sections, one section being mounted on the trunnion on one side of the nut and the other being mounted on the trunnion on the opposite side of the nut.

By this construction, it will be seen that a reverse gear of this type can be readily applied to a locomotive and that when an air motor is employed it can be connected to the air supply of the locomotive and that the nut, which is controlled by the reverse mechanism, is rigidly held in any position to which it is set, consequently, there is no liability of the parts changing position as in some types of reverse gears.

I claim:

1. The combination in a reverse gear for locomotives, of a screw shaft; fixed bearings therefor; a nut arranged to travel on the shaft and connected to the mechanism to be reversed; a motor arranged to turn said screw shaft; and means for controlling the motor.

2. The combination of a frame; bearings thereon; a screw shaft mounted in the bearings; a slideway on the frame; a nut arranged to slide on the slideway and having a threaded opening for the reception of the screw; a motor having a casing carried by the frame and having a shaft; a spindle connected to the shaft; a pinion thereon; a gear wheel on the screw shaft meshing with the pinion; means for controlling the motor; and means for reversing the motor.

3. The combination of a frame; bearings thereon; a screw shaft mounted in the bearings; a slideway on the frame; a nut arranged to slide on the slideway and having a threaded opening for the reception of the screw; an air motor having a casing carried by the frame and having a shaft; a spindle connected to the shaft; a pinion thereon; a gear wheel on the screw shaft meshing with the pinion; a valve for controlling the flow of air to the motor; and means for reversing the motor.

4. The combination of a frame; bearings thereon; a screw shaft mounted in the bearings; a nut on the screw shaft arranged to travel on the frame, said nut being arranged to be connected to the mechanism to be reversed; a head on one end of the screw shaft for the reception of turning means; a bracket; a motor arranged out of line with the screw shaft; a shaft for the motor mounted in a bearing in the frame; a pinion detachably connected to the said shaft; and a gear wheel on the screw shaft with which the pinion meshes, the parts being so arranged that, on the removal of the detachable pinion, a crank can be applied to the head of the screw shaft and the screw turned to shift the nut.

5. The combination in a reverse gear for locomotives, of a screw shaft; means for driving said shaft; a nut having a body portion and two threaded sections to receive the screw shaft, said sections being adjustable toward and from each other so as to take up the wear of the parts.

6. The combination of a screw shaft; means for turning the shaft; a nut having a body portion; flanged screw sections mounted on the body portion; bolts attaching the two parts to the body portion; and removable liners mounted between the flanges on the parts and the body portion.

7. The combination in a screw reverse gear for locomotives, of a frame; a screw shaft thereon; a gear wheel on the shaft; an operating motor having a shaft; a spindle detachably mounted in the shaft of the operating motor; and a pinion carried by the spindle and meshing with the gear wheel so that, on the removal of the spindle from the shaft, the pinion can be detached so as to allow the screw to be turned by hand independent of the motor.

8. The combination in a screw reverse gear for locomotives, of a frame; a screw shaft thereon; an air motor mounted on the frame and gearing between the shaft of the motor and the screw shaft; means by which the said gearing can be disconnected so that the screw shaft can be turned by hand independent of the motor; a nut on the screw shaft to which the mechanism leading to the valve control is connected, said nut being adjustable to take up for wear; a plate on the frame having indicating marks; and an indicator on the nut arranged to travel in close proximity to the plate.

In testimony whereof, I have signed my name to this specification, in the presence of two subscribing witnesses.

KENNETH RUSHTON.

Witnesses:
  C. E. ROBINSON,
  BLAIR N. REILEY.